US011803972B2

United States Patent
Konishi (10) Patent No.: US 11,803,972 B2
(45) Date of Patent: Oct. 31, 2023

(54) INFORMATION PROCESSING APPARATUS, CONTROL METHOD, AND PROGRAM FOR ACCURATELY LINKING FRAGMENTED TRAJECTORIES OF AN OBJECT

(71) Applicant: NEC CORPORATION, Tokyo (JP)

(72) Inventor: Yusuke Konishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 771 days.

(21) Appl. No.: 16/961,350

(22) PCT Filed: Jan. 12, 2018

(86) PCT No.: PCT/JP2018/000637
§ 371 (c)(1),
(2) Date: Jul. 10, 2020

(87) PCT Pub. No.: WO2019/138537
PCT Pub. Date: Jul. 18, 2019

(65) Prior Publication Data
US 2020/0342609 A1    Oct. 29, 2020

(51) Int. Cl.
*G06T 7/20* (2017.01)
*G06T 7/215* (2017.01)
(Continued)

(52) U.S. Cl.
CPC .............. *G06T 7/20* (2013.01); *G06N 20/00* (2019.01); *G06T 7/215* (2017.01); *G06T 7/251* (2017.01);
(Continued)

(58) Field of Classification Search
CPC ........... G06T 7/20; G06T 7/215; G06T 7/251; G06N 20/00; G06N 20/53; G06V 10/70; G06V 10/82
(Continued)

(56) References Cited

U.S. PATENT DOCUMENTS

| 10,515,554 | B1 * | 12/2019 | Shamasundar ...... G01C 23/005 |
| 11,014,555 | B1 * | 5/2021 | Beauchamp .......... H04W 4/023 |

(Continued)

FOREIGN PATENT DOCUMENTS

| JP | 2009-055139 A | 3/2009 |
| JP | 2010-063001 A | 3/2010 |

(Continued)

OTHER PUBLICATIONS

Daisuke Sugimura et al., "Associating Trajectories using Gait Features for Tracking People in Crowds", Institute of Industrial Science, the University of Tokyo, MIRU2010, Jul. 2010, 8 pages.
(Continued)

*Primary Examiner* — Gabriel I Garcia
(74) *Attorney, Agent, or Firm* — Sughrue Mion, PLLC (57) ABSTRACT

An information processing apparatus is communicably connected to a link rule storage unit. The link rule storage unit stores a link rule. The link rule represents a criterion as to whether or not to link a plurality of pieces of trajectory data representing a trajectory of an object into one. Further, the link rule is a criterion for linking the plurality of pieces of trajectory data estimated to represent the trajectory of the same object. The information processing apparatus obtains a plurality of pieces of trajectory data, and classifies the obtained plurality of pieces of trajectory data into groups for each object. The information processing apparatus updates the link rule stored in the link rule storage unit by using the plurality of pieces of trajectory data classified into the groups.

9 Claims, 6 Drawing Sheets (51) Int. Cl.
*G06T 7/246* (2017.01)
*G06N 20/00* (2019.01)
*G06V 10/70* (2022.01)
*G06V 10/82* (2022.01)
*G06V 20/52* (2022.01)

(52) U.S. Cl.
CPC .............. *G06V 10/70* (2022.01); *G06V 10/82* (2022.01); *G06V 20/53* (2022.01)

(58) Field of Classification Search
USPC ........................................................ 382/103
See application file for complete search history.

(56) References Cited

U.S. PATENT DOCUMENTS

| | | | |
|---|---|---|---|
| 2007/0094166 A1* | 4/2007 | Addison | G06N 3/12 706/13 |
| 2009/0052739 A1 | 2/2009 | Takahashi et al. | |
| 2015/0019161 A1 | 1/2015 | Moriguchi et al. | |
| 2016/0146617 A1* | 5/2016 | MacFarlane | G01C 21/3815 701/532 |

FOREIGN PATENT DOCUMENTS

| | | |
|---|---|---|
| JP | 2011-100175 A | 5/2011 |
| WO | 2013/128852 A1 | 9/2013 |

OTHER PUBLICATIONS

International Search Report for PCT/JP2018/000637 dated Mar. 13, 2018.

\* cited by examiner

INFORMATION PROCESSING APPARATUS, CONTROL METHOD, AND PROGRAM FOR ACCURATELY LINKING FRAGMENTED TRAJECTORIES OF AN OBJECT

CROSS-REFERENCE TO RELATED APPLICATIONS

This application is a National Stage of International Application No. PCT/JP2018/000637 filed on Jan. 12, 2018.

TECHNICAL FIELD

The present invention relates to a technology of surveilling an object.

BACKGROUND ART

Systems which track an object such as a person or a vehicle passing through a surveillance location by using a camera and the like are developed. In these systems, for example, a time-series change in a position of the object, that is, trajectory data representing a trajectory is generated.

The trajectory data may be fragmented due to an installation status of the camera, an environmental condition such as lighting at a site, overlapping of objects, and the like. That is, one trajectory which is originally continuous may be detected by being divided into a plurality of pieces of trajectory data. Therefore, a technology for linking such fragmented trajectories is developed.

For example, Patent Document 1 discloses a technology of linking pieces of trajectory data obtained by a plurality of cameras by associating the pieces of trajectory data in an area in which fields of view overlap between the cameras. Patent Document 2 discloses a technology of linking pieces of trajectory data by associating areas of persons between different images according to a similarity of feature values such as colors or patterns in the areas of the persons detected from a camera. Non-Patent Document 1 discloses a technology of linking fragmented pieces of trajectory data based on a similarity of feature values such as a person's walking, movement, and appearance.

RELATED DOCUMENT

Patent Document

[Patent Document 1] Japanese Patent Application Publication No. 2010-63001
[Patent Document 2] Japanese Patent Application Publication No. 2011-100175

Non-Patent Document

[Non-Patent Document 1] Sugimura and 4 others, "Associating Trajectories using Gait Features for Tracking People in Crowds", The Meeting on Image Recognition and Understanding (MIRU 2010), July 2010

SUMMARY OF THE INVENTION

Technical Problem

The installation status, the environmental condition, or the like of the camera can change over time. For example, a case where a new camera is installed or a location of an existing camera is changed and the like are considered. In all of the above-described documents in the related art, such a change in the installation status or environmental condition of the camera is not described.

The present invention is provided in view of the problem described above. One object of the present invention is related to providing a technology of accurately linking fragmented trajectories of an object.

Solution to Problem

In one example embodiment according to the present invention, there is provided an information processing apparatus communicably connected to a link rule storage unit that stores a link rule representing a criterion as to whether or not to link a plurality of pieces of trajectory data representing a trajectory of an object into one.

The information processing apparatus includes 1) a classification unit that obtains a plurality of pieces of trajectory data, and classifies the obtained plurality of pieces of trajectory data into groups for each object, and 2) an update unit that updates the link rule stored in the link rule storage unit by using the plurality of pieces of trajectory data classified into the groups.

The link rule is a criterion for linking the plurality of pieces of trajectory data estimated to represent the trajectory of the same object.

In another example embodiment according to the present invention, there is provided a control method executed by a computer. The computer is communicably connected to a link rule storage step of storing a link rule representing a criterion as to whether or not to link a plurality of pieces of trajectory data representing a trajectory of an object into one.

The control method includes 1) a classification step of obtaining a plurality of pieces of trajectory data, and classifying the obtained plurality of pieces of trajectory data into groups for each object, and 2) an update step of updating the link rule stored in the link rule storage step by using the plurality of pieces of trajectory data classified into the groups.

The link rule is a criterion for linking the plurality of pieces of trajectory data estimated to represent the trajectory of the same object.

A program of the present invention causes a computer to execute each step included in the control method of the invention.

Advantageous Effects of Invention

According to the present invention, there is provided a technology of accurately linking fragmented trajectories of an object.

BRIEF DESCRIPTION OF THE DRAWINGS

The above objects and other objects, features and advantages will become more apparent from the following description of the preferred example embodiments and the accompanying drawings.

DESCRIPTION OF EMBODIMENTS

Hereinafter, example embodiments according to the present invention will be described by using the drawings. In all of the drawings, the same components are denoted by the same reference numerals, and description thereof is not repeated as appropriate. In addition, unless otherwise described, in each of block diagrams, each of blocks represents not a hardware unit but a functional unit configuration.

Example Embodiment 1

<Overview>

Figure 1:
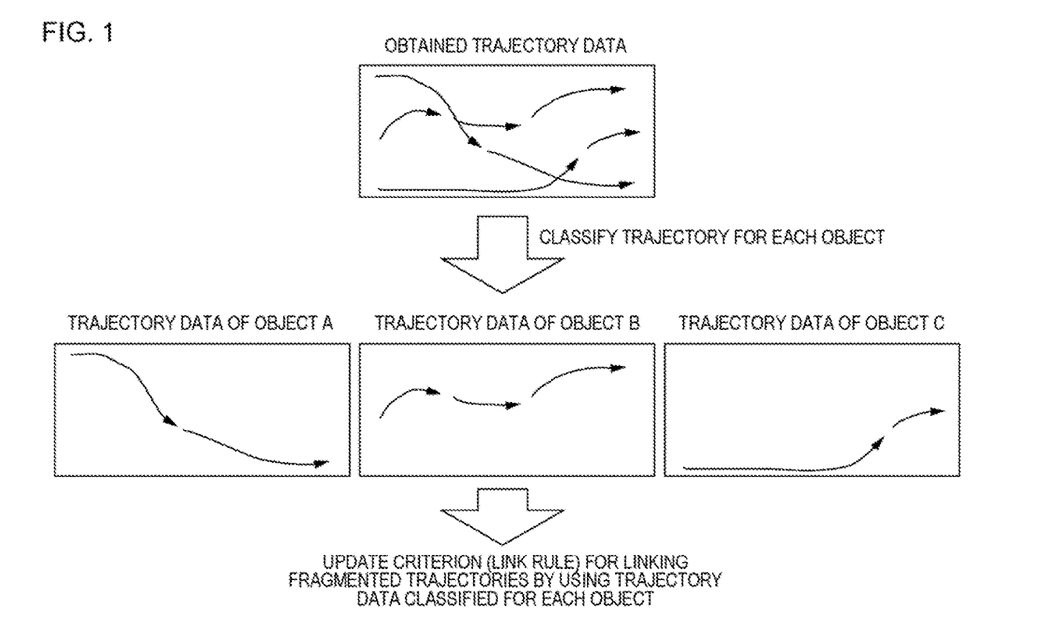
FIG. 1 is a diagram illustrating an overview of an operation of an information processing apparatus (an information processing apparatus 2000 illustrated in FIG. 2) according to Example Embodiment 1.

FIG. 1 is a diagram illustrating an overview of an operation of an information processing apparatus (the information processing apparatus 2000 illustrated in FIG. 2) according to Example Embodiment 1. FIG. 1 is a conceptual diagram for facilitating understanding of the operation of the information processing apparatus 2000, and the operation of the information processing apparatus 2000 is not specifically limited.

The information processing apparatus 2000 obtains trajectory data. The trajectory data is data representing a trajectory of an object. The object is any object which can move over time. For example, the object is a person or a car. The trajectory data is data indicating a position of the object at each of a plurality of time points, that is, time-series data of the position of the object. The position of the object may be a position in a two-dimensional coordinate system or a position in a three-dimensional coordinate system. In FIG. 1, the trajectory data is represented by arrows.

The information processing apparatus 2000 is an apparatus which updates a link rule used for linking pieces of trajectory data. The link rule represents a criterion as to whether or not to link a plurality of pieces of trajectory data. By the linking according to the link rule, the plurality of pieces of trajectory data estimated to represent a trajectory of the same object are linked. The link rule is stored in a link rule storage unit 10 described below.

The information processing apparatus 2000 classifies the obtained trajectory data into groups for each object. For example, in FIG. 1, the obtained seven pieces of trajectory data are classified into trajectory data of an object A, trajectory data of an object B, and trajectory data of an object C. The information processing apparatus 2000 updates the link rule stored in the link rule storage unit 10 by using the classified trajectory data.

<Advantageous Effect>

According to the information processing apparatus 2000 of Example Embodiment 1, the link rule is updated by using the trajectory data classified for each object. Here, by classifying the trajectory data for each object, it is possible to determine the trajectory data that should be essentially obtained in a state of being linked without being fragmented. By using such a group, it is possible to know in what relationship the trajectory data to be connected is. Thus, according to the information processing apparatus 2000, it is possible to appropriately determine the link rule for linking the pieces of trajectory data.

As described above, an installation status and an environmental condition of a camera can change over time. As a result, the criterion for linking the pieces of trajectory data may change. Even if the criterion for linking the trajectory data changes as described above, the link rule can be appropriately determined by updating the link rule by using the information processing apparatus 2000 according to the present example embodiment. In addition, there is an advantage that the link rule can be easily changed as compared with a method of manually determining the link rule.

Hereinafter, the information processing apparatus 2000 according to the present example embodiment will be described in more detail.

<Example of Functional Configuration of Information Processing Apparatus 2000>

Figure 2:
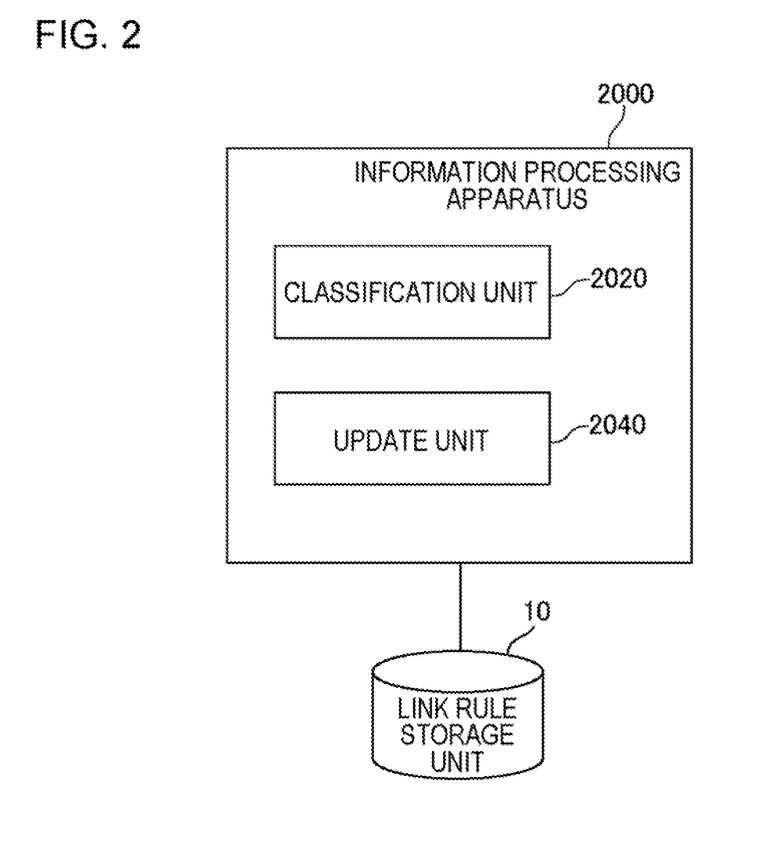
FIG. 2 is a diagram illustrating a configuration of the information processing apparatus 2000 according to Example Embodiment 1.

FIG. 2 is a diagram illustrating a configuration of the information processing apparatus 2000 according to Example Embodiment 1. The information processing apparatus 2000 is communicably connected to the link rule storage unit 10. As described above, the link rule storage unit 10 stores link rules. The information processing apparatus 2000 includes a classification unit 2020 and an update unit 2040. The classification unit 2020 obtains the plurality of pieces of trajectory data, and classifies the obtained trajectory data into groups for each object. The update unit 2040 updates the link rule stored in the link rule storage unit 10 by using the classified trajectory data.

<Hardware Configuration of Information Processing Apparatus 2000>

Each of function configuration units of the information processing apparatus 2000 may be realized by hardware (for example, hard-wired electronic circuit or the like) which realizes each of the function configuration units or may be realized by a combination (for example, a combination of the electronic circuit and a program controlling the electronic circuit or the like) of hardware and software. Hereinafter, a case where each of the function configuration units in the information processing apparatus 2000 is realized by a combination of hardware and software will be further described.

Figure 3:
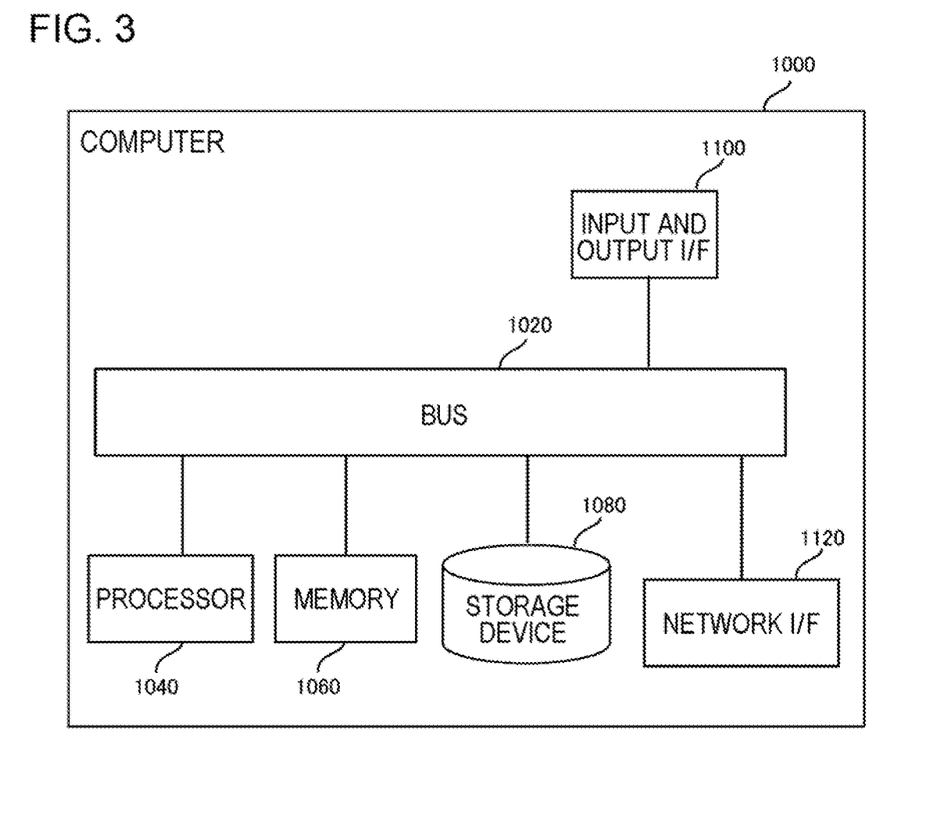
FIG. 3 is a diagram illustrating a computer 1000 for realizing the information processing apparatus 2000.

FIG. 3 is a diagram illustrating a computer 1000 for realizing the information processing apparatus 2000. The computer 1000 is a predetermined computer. For example, the computer 1000 is a personal computer (PC), a server machine, a tablet terminal, a smartphone, or the like. Further, the computer 1000 may be a camera used to image an object. As such a camera, for example, a camera called an intelligent camera, a network camera, an internet protocol (IP) camera, or the like can be used. The computer 1000 may be a dedicated computer designed to realize the information processing apparatus 2000 or may be a general purpose computer.

The computer 1000 includes a bus 1020, a processor 1040, a memory 1060, a storage device 1080, an input and output interface 1100, and a network interface 1120. The bus 1020 is a data transmission line through which the processor 1040, the memory 1060, the storage device 1080, the input and output interface 1100, and the network interface 1120 mutually transmit and receive data. Meanwhile, a method of connecting the processors 1040 and the like to each other is not limited to bus connection. The processor 1040 is a processor such as a central processing unit (CPU), a graphics processing unit (GPU), a field-programmable gate array (FPGA), or the like. The memory 1060 is a main storage realized by using a random access memory (RAM) or the like. The storage device 1080 is an auxiliary storage realized by using a hard disk drive, a solid state drive (SSD), a memory card, a read only memory (ROM), or the like. Meanwhile, the storage device 1080 may be configured with the same hardware as the hardware constituting the main storage such as a RAM.

The input and output interface 1100 is an interface for connecting the computer 1000 and an input and output device. The network interface 1120 is an interface for connecting the computer 1000 to a communication network. The communication network is, for example, a local area network (LAN) or a wide area network (WAN). A method by which the network interface 1120 connects to the communication network may be a wireless connection or a wired connection.

The storage device 1080 stores a program module which realizes each of the functional configuration units of the information processing apparatus 2000. By reading each of these program modules into the memory 1060 and executing the program module, the processor 1040 realizes a function corresponding to each of the program modules.

<Hardware Configuration of Link Rule Storage Unit 10>

The link rule storage unit 10 is a predetermined storage apparatus which can store link rules. The link rule storage unit 10 may be provided inside the information processing apparatus 2000 or may be provided outside. In the former case, for example, the link rule storage unit 10 is realized by the storage device 1080. In the latter case, for example, the link rule storage unit 10 is connected to the computer 1000 through the input and output interface 1100 and the network interface 1120.

<Flow of Process>

Figure 4:
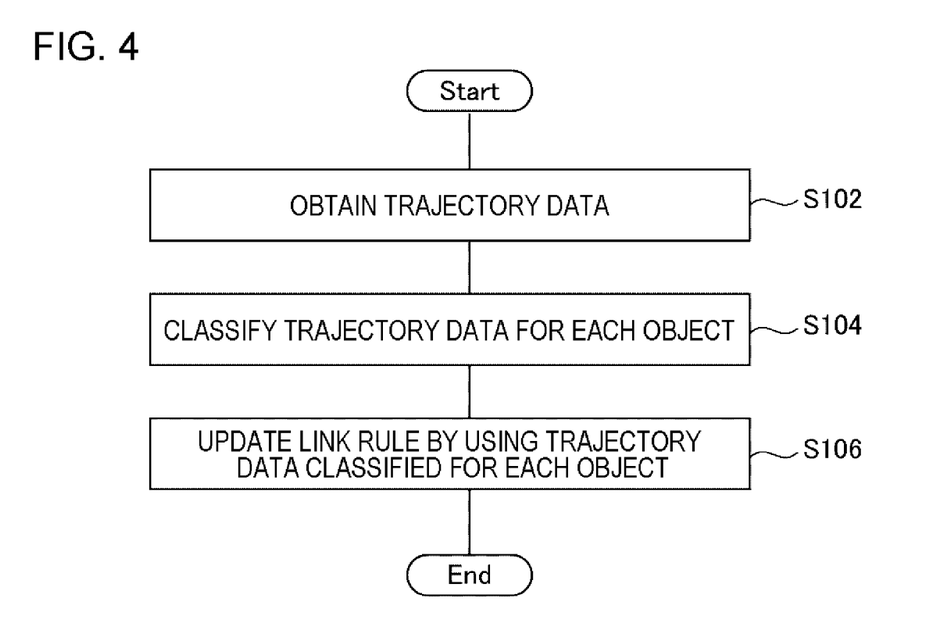
FIG. 4 is a flowchart illustrating a flow of a process executed by the information processing apparatus 2000 according to Example Embodiment 1.

FIG. 4 is a flowchart illustrating a flow of a process executed by the information processing apparatus 2000 according to Example Embodiment 1. The classification unit 2020 obtains a plurality of pieces of trajectory data (S102). The classification unit 2020 classifies the plurality of pieces of trajectory data for each object (S104). The update unit 2040 updates a link rule by using the classified trajectory data (S106).

A timing at which the information processing apparatus 2000 executes a series of processes illustrated in FIG. 4 varies. For example, the information processing apparatus 2000 executes the series of processes at predetermined time intervals (for example, once an hour or once a day). In addition, for example, the information processing apparatus 2000 executes a series of processes according to a manual operation by an administrator or the like.

In addition, for example, the information processing apparatus 2000 may detect a change in the installation status or the environmental condition of the camera, and may execute a series of processes according to the detection. For example, the installation status of the camera can be recognized by periodically receiving information such as a heartbeat from each camera. In addition, for example, by receiving information on illuminance from an illuminance sensor installed at a surveillance location, it is possible to recognize a change in brightness at the surveillance location. Specifically, when a difference between illuminance at the time of updating the previous link rule and the current illuminance is large (for example, when the difference is equal to or more than a predetermined threshold value), the information processing apparatus 2000 executes a series of operations.

<Obtainment of Trajectory Data: S102>

The classification unit 2020 obtains the trajectory data (S102). There are various methods by which the classification unit 2020 obtains the trajectory data. For example, the classification unit 2020 obtains the trajectory data by receiving the trajectory data from an apparatus which generates the trajectory data. In addition, for example, the classification unit 2020 may obtain the trajectory data by accessing the storage apparatus in which the trajectory data is stored.

Note that, the trajectory data can be generated by using a video obtained from a camera, a detection result of a floor pressure sensor or an infrared sensor, or the like. An existing technology can be used as a specific technology of generating the trajectory data.

<Classification of Trajectory Data: S104>

The classification unit 2020 classifies the obtained pieces of trajectory data into groups for each object (S104). That is, the pieces of trajectory data are divided into the groups such that trajectory data included in one group represents trajectories of the same object. Hereinafter, a specific example of the method will be described.

For example, the classification unit 2020 obtains detection information which is information on an identifier of an object detected by a sensor, and classifies the trajectory data by using the detection information. Hereinafter, the identifier of the object is also referred to as an object identifier. The object identifier is a unique identifier by which an object can be uniquely specified.

Various sensors can be adopted as the sensor of detecting the object identifier. For example, a camera can be used as the sensor. In this case, for example, the object identifier is an image feature of the object obtained from an image of the object generated by the camera. The image feature of the object includes, for example, biometric information of a person (a feature value of a face or a fingerprint) obtained from an image including the person, an identifier (a number plate) of a vehicle obtained from an image including the vehicle, or the like.

In addition, for example, an apparatus which receives the identifier through wireless communication can be used as the sensor. In this case, for example, the identifier transmitted from a radio frequency identifier (RFID) tag held by the object is used as the object identifier, and an RFID reader is used as the sensor.

The detection information indicates "an object identifier, a detection location of the object identifier, and a detection time of the object identifier". The detection location of the object identifier is represented by, for example, a detection range of a sensor which detects the object identifier. Meanwhile, in a case where the sensor can uniquely determine a position of the object and then obtain the object identifier (for example, in a case where global positioning system (GPS) coordinates can be obtained from a wireless communication terminal held by the object, or the like), the position may be a detection location of the object identifier.

The location at which the sensor which detects the object identifier is installed is a part of the surveillance location of the object (the location at which the trajectory is to be obtained). It is preferable that the sensors are installed at a plurality of different positions within the surveillance location of the object.

In a case of using the detection information, the classification unit 2020 associates the trajectory data with the object identifier. The classification unit 2020 divides the trajectory data into groups so that a plurality of pieces of trajectory data associated with the same object identifier are included in the same group. For example, trajectory data 1 to trajectory data 4 are obtained, and the trajectory data 1 and 3 are associated with an object identifier A and the trajectory data 2 and 4 are associated with an object identifier B. In this case, a group including the trajectory data 1 and 3, and a group including the trajectory data 2 and 4 are generated.

The classification unit 2020 determines trajectory data indicating that the object passes through the detection location indicated by the detection information at the detection time indicated by the detection information, and associates the determined trajectory data with the object identifier indicated by the detection information. Here, there is a possibility that a plurality of pieces of trajectory data indicating that the object passes through the detection location indicated by the detection information at the detection time indicated by the detection information. In this case, the object identifier may be associated with each piece of the plurality of pieces of trajectory data of an object, or the object identifier may not be associated with any of the plurality of pieces of trajectory data. In the latter case, the object identifier is associated with the trajectory data only in a case where only one object passes, at the time when the object identifier is detected, through the detection location. In a case of associating the object identifier with the plurality of pieces of trajectory data, one trajectory data belongs to a plurality of groups.

There are various methods by which the classification unit 2020 obtains the detection information. For example, the classification unit 2020 obtains the detection information by accessing the storage apparatus in which the detection information is stored. In addition, for example, the detection information may be transmitted from the sensor which creates the detection information to the information processing apparatus 2000.

The method of classifying the trajectory data into groups for each object is not limited to the above-described method using the detection information. For example, in a case where trajectory data is generated from a video of a camera, the trajectory data is associated with an image feature of an object obtained from the camera. The classification unit 2020 obtains the trajectory data associated with the image feature of the object. In this case, the classification unit 2020 classifies the trajectory data for each object based on the image feature of the object associated with the trajectory data. Specifically, the classification unit 2020 performs classification so that a plurality of pieces of trajectory data of which associated image features are similar to each other are included in the same group. For example, the trajectory data is clustered based on the associated image features. In this manner, the pieces of the trajectory data of which associated image features are similar to each other are classified into the same cluster. The classification unit 2020 handles the cluster as a group for each object.

<Link Rule>

The link rule is a rule which represents a criterion as to whether or not to link the plurality of pieces of trajectory data representing the trajectory of the object into one. Further, the link rule is a rule for linking the plurality of pieces of trajectory data estimated to represent the trajectory of the same object. Hereinafter, a link rule will be described together with the method of linking the pieces of trajectory data.

The linking of the pieces of trajectory data is performed based on a feature value (hereinafter, a trajectory feature value) which can be computed from two pieces of trajectory data. As the trajectory feature value, 1) a distance between the two pieces of trajectory data, 2) a distance between end point coordinates of a trajectory represented by one piece of trajectory data and start point coordinates of a trajectory represented by the other piece of trajectory data, 3) an average distance in a time when the two pieces of trajectory data temporally overlap with each other, 4) an elapsed time from an end time of one piece of trajectory data (a time at which the end point coordinates are recorded) to a start time of the other piece of trajectory data (a time at which the start point coordinates are stored), 5) an inner product of average velocities of the two pieces of trajectory data, 6) a difference of the average velocities, 7) an inner product of an end point velocity of one piece of trajectory data and a start point velocity of the other piece of trajectory data, 8) a difference between the end point velocity of one piece of trajectory data and the start point velocity of the other piece of trajectory data, 9) a similarity of image features (a color, a shape, and the like) obtained from an image of the object corresponding to each trajectory data. Note that, a specific one trajectory feature value of a plurality of trajectory feature values may be used for linking the pieces of trajectory data, or a plurality of trajectory feature values may be used.

Various discriminators can be used in a method of determining whether or not to link the trajectory data based on the trajectory feature value. For example, as the discriminator, one which performs determination based on a threshold value, one which performs determination by using a classification tree, one which performs determination by using linear discrimination, one which performs determination by using a support vector machine (SVM), one which performs determination by using a neural network, and the like can be used.

The link rule indicates one or more parameters constituting these various discriminators. For example, in a case of the discriminator which performs determination based on the threshold value, the link rule indicates this threshold value.

<Update of Link Rule: S106>

The update unit 2040 updates the link rule by using the trajectory data classified into the group (S106). For example, the update unit 2040 generates learning data of a positive example and learning data of a negative example by using a trajectory feature value computed from a combination of the obtained pieces of trajectory data, and executes machine learning using the learning data to update the link rule. Here, the learning data of the positive example is a trajectory feature value computed from a set of pieces of trajectory data to be linked to each other. On the other hand, the learning data of the negative example is a trajectory feature value computed from a set of pieces of trajectory data not to be linked to each other.

For generating the learning data of the positive example, a combination of pieces of trajectory data classified into the same group can be used. For example, the update unit 2040 uses all combinations of two pieces of trajectory data which can be selected from the pieces of trajectory data classified into the same group to generate positive example data. In addition, for example, the update unit 2040 may use only some of the combinations of the two pieces of trajectory data which can be selected from the pieces of trajectory data classified into the same group to generate the positive example data. In this case, the combination of the pieces of trajectory data used for generating the positive example data can be determined based on the trajectory feature value.

There are various methods of determining the combination of the pieces of trajectory data used for generating the positive example data based on the trajectory feature value. For example, the update unit 2040 compares the trajectory feature value and a threshold value for each combination of two pieces of trajectory data which can be selected from the pieces of trajectory data classified into the same group. Here, as for a trajectory feature value in which the degree to which trajectory data is to be linked increases as the value increases (for example, a similarity of an image feature obtained from an image of an object corresponding to the trajectory data), only the trajectory feature amount equal to or more than a predetermined threshold value is used as the positive example data. On the other hand, as for a trajectory feature value in which the degree to which trajectory data is to be linked increases as the value decreases (for example, a distance between the two pieces of trajectory data), only the trajectory feature amount equal to or less than a predetermined threshold value is used as the positive example data.

In addition, for example, the update unit 2040 performs clustering, based on the trajectory feature value, on each combination of two pieces of trajectory data which can be selected from the pieces of trajectory data classified into the same group, so that the trajectory data may be classified into a cluster having a high degree to which trajectory data is to be linked and a cluster having a low degree to which trajectory data is to be linked. In this case, the trajectory feature value computed for each combination classified into the clusters having the high degree to which the trajectory data is to be linked is used as the positive example data.

For the generation of the learning data of the negative example, each combination of the two pieces of trajectory data which can be selected from the pieces of trajectory data classified into different groups can be used. Further, among trajectory feature values obtained from each combination which can be selected from the pieces of trajectory data classified into the same group, a trajectory feature value not used as the positive example data may be added to the negative example data.

Note that, an existing technology can be used for a technology of causing the discriminator to learn by using the learning data of the positive example and the learning data of the negative example.

Example Embodiment 2

Figure 5:
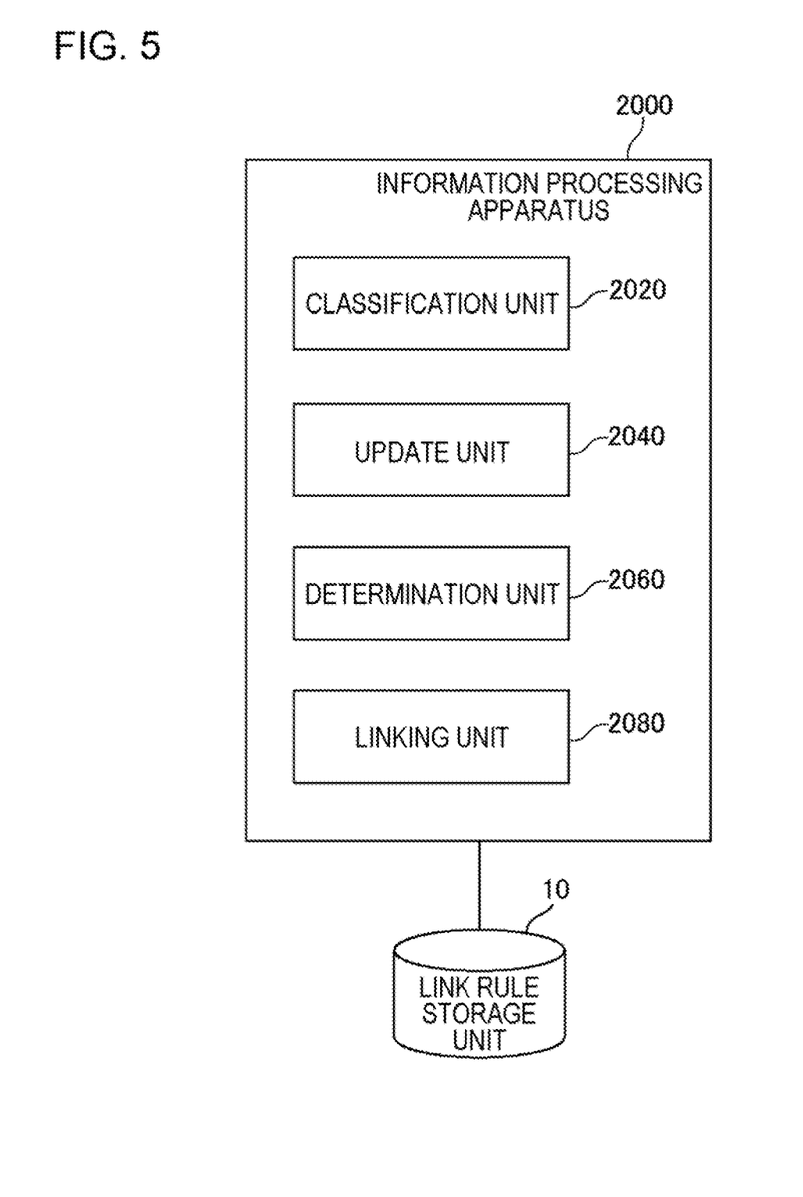
FIG. 5 is a diagram illustrating a functional configuration of the information processing apparatus 2000 according to Example Embodiment 2.

FIG. 5 is a diagram illustrating a functional configuration of the information processing apparatus 2000 according to Example Embodiment 2. The information processing apparatus 2000 according to Example Embodiment 2 has the same functions as the information processing apparatus 2000 of Example Embodiment 1 except for items to be described below.

The information processing apparatus 2000 according to Example Embodiment 2 has a function of linking pieces of trajectory data by using a link rule stored in the link rule storage unit 10. For this purpose, the information processing apparatus 2000 includes a determination unit 2060 and a linking unit 2080. The determination unit 2060 obtains trajectory data. In addition, the determination unit 2060 obtains a link rule from the link rule storage unit 10. Further, the determination unit 2060 determines whether or not to link the pieces of trajectory data based on the obtained link rule. The linking unit 2080 links the pieces of trajectory data determined to be linked.

<Flow of Process>

Figure 6:
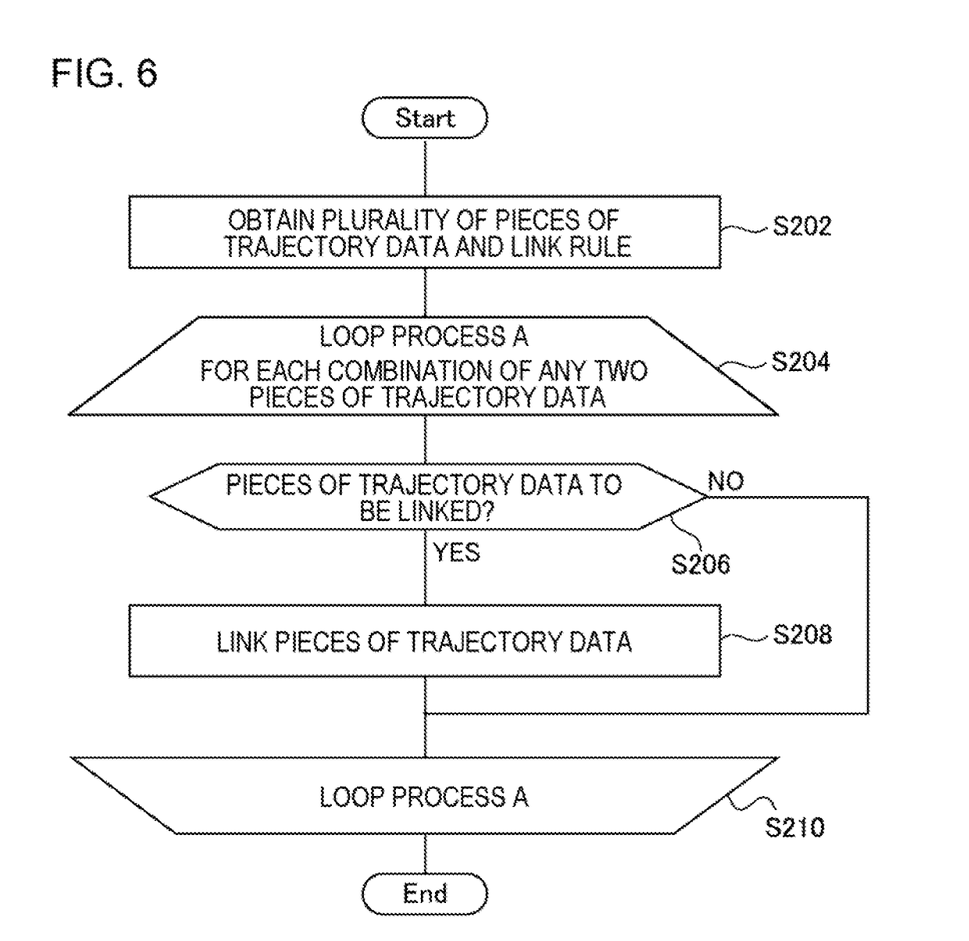
FIG. 6 is a flowchart illustrating a flow of a process executed by the information processing apparatus 2000 according to Example Embodiment 2.

FIG. 6 is a flowchart illustrating a flow of a process executed by the information processing apparatus 2000 according to Example Embodiment 2. The determination unit 2060 obtains a plurality of pieces of trajectory data and a link rule (S202). A loop process A (S204 to S210) is a loop process executed once for each of all combinations obtained by selecting any two pieces from the obtained set of trajectory data. In S204, the determination unit 2060 determines whether or not a loop process A is already executed for all combinations. In a case where the loop process A is already performed for all combinations, the loop process A ends. On the other hand, in a case where there is a combination on which the loop process A is not yet performed, the determination unit 2060 executes S206 to S210 for one of the combinations.

The determination unit 2060 determines whether or not to link the two selected pieces of trajectory data based on the link rule (S206). In a case where it is determined that the two pieces of trajectory data are to be linked (YES in S206), the linking unit 2080 links the two pieces of trajectory data (S208). On the other hand, in a case where it is determined that the two pieces of trajectory data are not to be linked (NO in S206), the process in FIG. 6 proceeds to S210. Since S210 is an end of the loop process A, the process in FIG. 6 returns to S204.

Note that, in a case where certain two pieces of trajectory data are linked, in the subsequent processes, the two pieces of trajectory data may be directly used as a target of the loop process A, or trajectory data after the linking instead of the two pieces of trajectory data may be used as the target of the loop process A.

<Determination on Whether or not to Link: S206>

The determination unit 2060 can be realized as the various discriminators described above. The determination as to whether or not to link the two pieces of trajectory data is performed by using a trajectory feature value and a link rule. For example, it is assumed that the determination unit 2060 is a discriminator which performs the determination based on a threshold value. In this case, the determination unit 2060 computes the trajectory feature value for the two pieces of trajectory data, and compares the trajectory feature value with a threshold value indicated by the link rule to determine whether or not to link the two pieces of trajectory data. For example, "distance between two pieces of trajectory data" is used as the trajectory feature value. In this case, the determination unit 2060 is defined as a discriminator that "it is determined that pieces of trajectory data are linked when a trajectory feature value is equal to or less than a threshold value, and it is determined that the pieces of trajectory data are not linked when the trajectory feature value is greater than the threshold value", and a link rule indicates the threshold value. Therefore, the determination unit 2060 computes the distance between the two pieces of trajectory data, and determines that the two pieces of trajectory data are to be linked when the distance is equal to or less than the threshold value indicated in the link rule.

<Linking of Trajectory Data: S208>

The linking unit 2080 links the two pieces of trajectory data to generate one piece of trajectory data. An existing technology can be used as a technology of linking the trajectory data.

<Example of Hardware Configuration>

A hardware configuration of a computer which realizes the information processing apparatus 2000 according to Example Embodiment 3 is represented by FIG. 3 in the same manner as in Example Embodiment 1, for example. Meanwhile, the storage device 1080 of the computer 1000 which realizes the information processing apparatus 2000 of the present example embodiment further stores a program module which realizes a function of the information processing apparatus 2000 of the present example embodiment.

Here, the information processing apparatus 2000 may be realized by using a plurality of computers. For example, a function of updating the link rule and a function of linking the trajectory data based on the link rule can be implemented over computers different from each other. In this case, the information processing apparatus 2000 can be regarded as an information processing system including a computer having a function of updating a link rule and a computer having a function of linking trajectory data based on the link rule.

<Advantageous Effect>

According to the information processing apparatus 2000 of Example Embodiment 2, pieces of trajectory data are linked based on a link rule updated by the update unit 2040. Thus, the linking of the trajectory data is performed based on the link rule appropriately updated according to an installation status and an environmental condition of a camera. Therefore, it is possible to link the pieces of trajectory data with high accuracy.

Although the example embodiments of the present invention are described with reference to the drawings, these are examples of the present invention, and a combination of the respective example embodiments or various other configurations other than the example embodiments described above may be adopted.

The invention claimed is:

1. An information processing apparatus comprising:
    a classification unit that obtains a plurality of pieces of trajectory data representing a trajectory of an object, and classifies the obtained plurality of pieces of trajectory data into groups for each object; and
    an update unit that updates a link rule stored in a link rule storage unit by using the plurality of pieces of trajectory data classified into the groups, the link rule representing a criterion as to whether or not to link the plurality of pieces of trajectory data into one;
    wherein the information processing apparatus is communicably connected to the link rule storage unit, and
    wherein the link rule is a criterion for linking the plurality of pieces of trajectory data estimated to represent the trajectory of the same object.

2. The information processing apparatus according to claim 1,
    wherein the classification unit
        obtains detection information indicating a combination of an identifier of the object detected by a sensor, a detection location of the identifier, and a detection time of the identifier,
        associates trajectory data indicating a trajectory of the object positioned at the detection location indicated by the detection information at the detection time indicated by the detection information with the identifier indicated by the detection information, and
        classifies the plurality of pieces of trajectory data into the groups for each object by including the pieces of trajectory data having the associated identifier representing the same object in the same group.

3. The information processing apparatus according to claim 1,
    wherein the update unit updates the link rule by machine learning in which a feature value between pieces of trajectory data obtained from a combination of the pieces of trajectory data included in the same group is used as learning data of a positive example and a feature value obtained from a combination of pieces of trajectory data included in different groups is used as learning data of a negative example.

4. The information processing apparatus according to claim 1, further comprising:
    a determination unit that obtains the plurality of pieces of trajectory data, and determines whether or not to link the obtained plurality of pieces of trajectory data based on the link rule stored in the link rule storage unit; and
    a linking unit that links the pieces of trajectory data determined to be linked.

5. A control method executed by a computer, the method comprising:
    a classification step of obtaining a plurality of pieces of trajectory data representing a trajectory of an object, and classifying the obtained plurality of pieces of trajectory data into groups for each object; and
    an update step of updating a link rule stored in a link rule storage unit by using the plurality of pieces of trajectory data classified into the groups, the link rule representing a criterion as to whether or not to link the plurality of pieces of trajectory data into one,
    wherein the computer is communicably connected to the link rule storage unit, and
    wherein the link rule is a criterion for linking the plurality of pieces of trajectory data estimated to represent the trajectory of the same object.

6. The control method according to claim 5,
    wherein in the classification step,
        detection information indicating a combination of an identifier of the object detected by a sensor, a detection location of the identifier, and a detection time of the identifier is obtained,
        trajectory data indicating a trajectory of the object positioned at the detection location indicated by the detection information at the detection time indicated by the detection information is associated with the identifier indicated by the detection information, and
        the plurality of pieces of trajectory data are classified into the groups for each object by including the pieces of trajectory data having the associated identifier representing the same object in the same group.

7. The control method according to claim 5,
    wherein in the update step, the link rule is updated by machine learning in which a feature value between pieces of trajectory data obtained from a combination of the pieces of trajectory data included in the same group is used as learning data of a positive example and a feature value obtained from a combination of pieces of trajectory data included in different groups is used as learning data of a negative example.

8. The control method according to claim 5, further comprising:
    a determination step of obtaining the plurality of pieces of trajectory data, and determining whether or not to link the obtained plurality of pieces of trajectory data based on the link rule stored in the link rule storage unit; and
    a linking step of linking the pieces of trajectory data determined to be linked.

9. A non-transitory computer readable medium storing a program causing a computer to execute each step of a control method, the method comprising:
    a classification step of obtaining a plurality of pieces of trajectory data representing a trajectory of an object, and classifying the obtained plurality of pieces of trajectory data into groups for each object; and
    an update step of updating a link rule stored in a link rule storage unit by using the plurality of pieces of trajectory data classified into the groups, the link rule representing a criterion as to whether or not to link the plurality of pieces of trajectory data into one,
    wherein the computer is communicably connected to the link rule storage unit, and wherein the link rule is a criterion for linking the plurality of pieces of trajectory data estimated to represent the trajectory of the same object.

* * * * *